Figure 1:
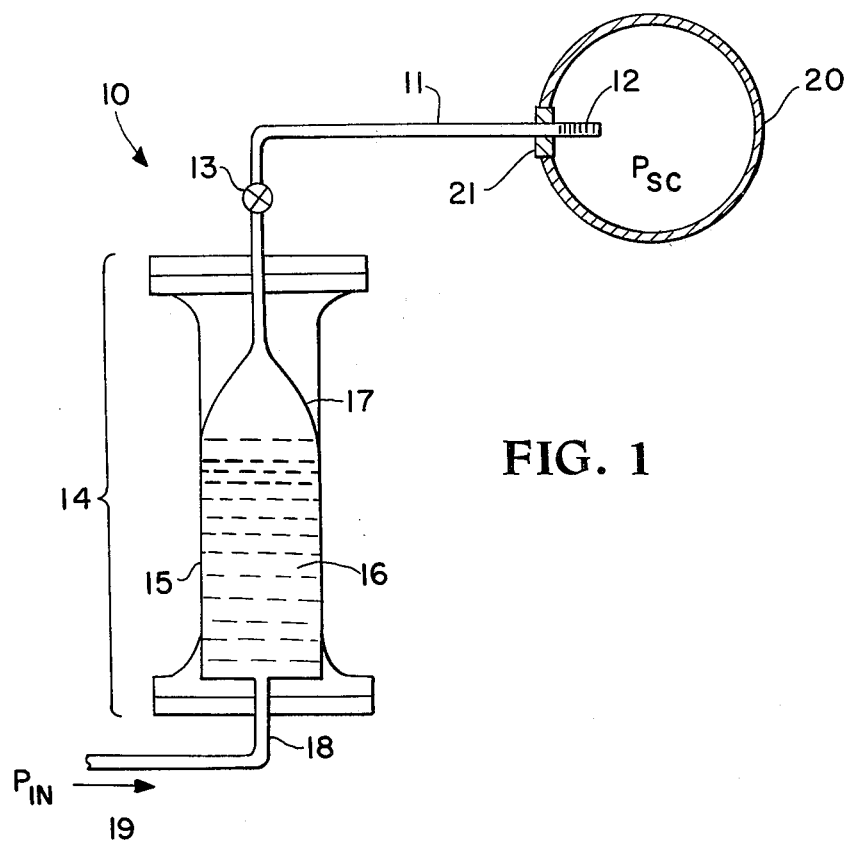
Figure 2:
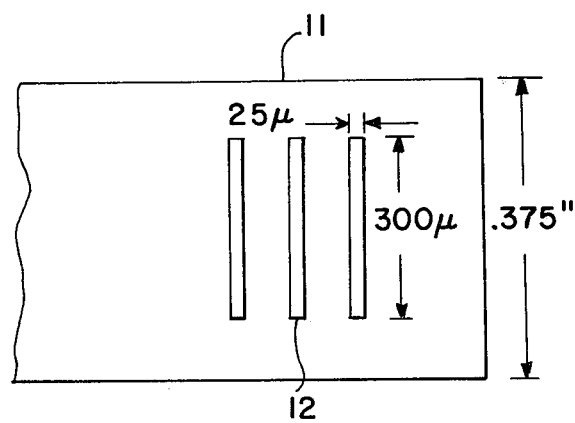

United States Patent [19]

Morrisette et al.

[11] 4,428,703
[45] Jan. 31, 1984

[54] POWDER FED SHEARED DISPERSAL PARTICLE GENERATOR

[75] Inventors: E. Leon Morrisette, Newport News; Dennis M. Bushnell, Hayes, both of Va.

[73] Assignee: The United States of America as represented by the Administrator of the National Aeronautics and Space Administration, Washington, D.C.

[21] Appl. No.: 297,488

[22] Filed: Aug. 28, 1981

[51] Int. Cl.³ .................. B65G 53/02; G01M 9/00
[52] U.S. Cl. .................. 406/155; 239/568; 241/95
[58] Field of Search .......... 406/142, 143, 155, 47, 406/49; 241/95, 39, 5; 239/568

[56] References Cited

U.S. PATENT DOCUMENTS

| | | | |
|---|---|---|---|
| 1,971,376 | 8/1934 | Hunt et al. | 406/155 |
| 2,687,593 | 8/1954 | Edwards . | |
| 2,771,320 | 11/1956 | Korwin | 239/568 X |
| 3,479,857 | 11/1969 | Bloxsom, Jr. et al. | 73/147 X |
| 3,709,026 | 1/1973 | Rhodes et al. | 73/12 |
| 3,893,335 | 7/1975 | Johnson et al. | 73/147 |
| 3,937,404 | 2/1976 | Johnson | 239/568 X |
| 4,031,748 | 6/1977 | Cramer | 73/147 |

Primary Examiner—John J. Love
Assistant Examiner—L. E. Williams
Attorney, Agent, or Firm—Howard J. Osborn; John R. Manning; Wallace J. Nelson

[57] ABSTRACT

The present invention discloses a particle generating system which is capable of breaking up agglomerations of particles and producing a cloud of uniform, submicron-sized particles at high pressure and high flow rates. This is achieved by utilizing a tubular structure 11 which has injection microslits 12 on its periphery to accept and disperse the desired particle feed 16. By supplying a carrying fluid 19 at a pressure, $P_{in}$, of approximately twice the ambient pressure of the velocimeter's settling chamber 20, $P_{sc}$, the microslits 12 will operate at choked flow conditions. The shearing action of this choked flow is sufficient to overcome interparticle bonding forces, thereby breaking up the agglomerates of the particle feed 16 into individual particles.

10 Claims, 2 Drawing Figures

POWDER FED SHEARED DISPERSAL PARTICLE GENERATOR

ORIGIN OF THE INVENTION

The invention described herein was made by employees of the U.S. Government and may be manufactured and used by or for the Government for government purposes without the payment of any royalties thereon or therefor.

BACKGROUND OF THE INVENTION

Until recently, pitot, static and total temperature probes have been the primary means of obtaining flow information in high speed flows. These probes have proven to be inadequate, however, for obtaining detailed measurements of more complex flow fields such as three-dimensional flows. As research in this area has heightened, so has the need for a means of accurately evaluating these flows. This increased need has been the primary impetus behind the development of nonintrusive measuring techniques.

One such technique, known as laser velocimetry, is designed to measure static density, temperature and three components of velocity in the flow field. The velocimeter is actually a particle velocity measuring device which requires the use of seeding particles in the flow to act as light scatters. It, therefore, will measure the gas velocity only if the particle and gas velocities are the same. Consequently, the particle requirements of this system are an important factor in its successful operation. Initially, there must be a sufficient number of particles of uniform size to obtain a statistically reliable velocity average at a point. The particles must be small and low in density to follow the flow, but they must be large enough to scatter light sufficient for the receiving optics to measure. In addition, the particles should not combust or evaporate in the high temperature and pressure of the setting chamber, and they should be both nonabrasive and noncorrosive.

This invention relates to a particle generating system which is capable of breaking up agglomerations of particles and producing a cloud of uniform, submicron-sized particles at high pressure and high flow rates. Conventional particle generators are incapable of meeting the rigorous demands imposed by the laser velocimeter. Smoke generators, although commonly used in other settings, are nonfunctional at the high mass flow rates (higher densities) and high pressure of the velocimeter's hypersonic tunnel because of the resultant interference with the generator's evaporation and condensation processes. In addition, such systems are very sensitive to small changes in the stagnation pressure of the tunnel. Fluidized bed systems are also inadequate because of their tendency to produce only aggregates or agglomerates of particles rather than single particles. This invention was designed to overcome the deficiencies of these previously utilized systems.

Accordingly, it is an object of this invention to provide an apparatus which is capable of producing a cloud of uniform, submicron-sized particles at high pressure and high flow rates.

Another object of the invention is to provide a particle generating system which remains independent of external environmental conditions.

Another object of the invention is to provide an apparatus which will effectuate consistent and uniform separation of particle agglomerations.

SUMMARY OF THE INVENTION

The foregoing and other objects of the invention are achieved by providing a particle generating system which utilizes a convenient particle feeding system such as a fluidized bed. In this system, the desired particles are mixed with a chemical which acts as a hydrophobic agent and electrical charge neutralizer, and are stored in an upright cylindrical casing. A fluid source is introduced from beneath, thereby lifting the particle mixture through a fairing and into a tube with extremely small slits (25–50$\mu$) on its periphery. By supplying a fluid at a pressure of approximately twice the ambient pressure of the velocimeter's settling chamber, the slits will operate at choked (sonic) flow conditions. The shearing action of this choked flow is sufficient to overcome inter-particle bonding forces, resulting in the generation of uniform, submicron-sized particles.

Other advantages and objects of the present invention will become apparent from the following explanation of an exemplary embodiment and accompanying drawings thereof.

BRIEF DESCRIPTION OF THE DRAWINGS

FIG. 1 is a side elevational view of a particle generator in accordance with this invention; and FIG. 2 is an enlarged sectional view of the tubular structure of FIG. 1.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION OF THE INVENTION

Referring now to FIGS. 1 and 2, there is seen an embodiment of the present invention, designated generally by the reference numeral 10. The particle generator 10 consists primarily of a tubular structure 11 which has injection microslits 12 on its periphery and is attached atop a particle feeding system 14.

The feeding system 14 comprises an upright cylindrical casing 15 which is used to store and supply the desired particle feed 16. The dimensions of the casing 15 are determined by the mass flow rate required for any particular application of the system. At the bottom of the casing 15 is an inlet structure 18 which is used to introduce the carrying fluid 19 to the particle feed 16. Although the fluid used in this embodiment is air, any other fluid which the velocimeter can tolerate may be used.

Because the particle generator 10 is designed to break up agglomerations, the experimentor will achieve the best results by utilizing particles which are manufactured in submicron size. In the disclosed embodiment, a submicron Teflon powder is used in the particle feed 16. There are, however, other commercially available dry powders, such as aluminum oxide, silicon carbide and talcum, which also may be used. Depending on the size of the injection microslits 12, the generator 10 will produce particles of a uniform size down to that of the smallest particle in the feed 16.

A difficult problem with developing a particle generator for operation at high back pressures is that the particles cannot be maintained for long periods of time. The natural inclination of small particles is agglomeration and deposition if a surface is near. To overcome that agglomeration problem, silicon dioxide, $SiO_2$, is added to the Teflon, coating the agglomerations and acting as a hydrophobic agent and electrical charge neutralizer. This ensures as easier and longer lasting primary particle dispersion and improves the fluidizing characteristics of the particle feed 16. The $SiO_2$ may be added to any other particle feed 16 with the same result.

Immediately above the particle feed 16 is an exhaust fairing 17 which accepts and guides the flow from the particle feed 16. The fairing's 17 primary function is to provide a smooth outline for the flow which will reduce drag and ensure a more laminar flow in the tubular structure 11. Any acceleration through the fairing 17 is minimal and does not bear on the generator's 10 operation. The top of the exhaust fairing 17 exends from the upper portion of the casing 15 thereby providing a connection for the tubular structure 11.

The tubular structure 11 is attached to the feeding system 14 by means of a ball valve 13. This connection keeps the flow uniform and smooth as it enters the tubular structure 11 and prevents clogging or buildup of particles. Along the periphery of the tubular structure 11 are numerous injection microslits 12. To minimize the agglomeration-deposition problem, the tubular structure 11 is placed in the velocimeter's settling chamber 20 so that the final particle generation is into the tunnel environment. This connection is achieved by a high pressure fitting 21 which ensures that uniform pressurization in the settling chamber 20 is maintained. Once generated, the particles may then be utilized quickly and effectively.

FIG. 2 presents an enlarged view of the tubular structure 11, emphasizing the injection microslits 12 thereon. The tubular structure 11 in the disclosed embodiment has an outside diameter of 0.375" while the microslits 12 have a width of approximately 25–50μ and a length of approximately 300μ. Depending on the desired particle size and recognizing the limitations imposed by particle manufacture, the dimensions of the individual microslits 12 may be altered accordingly. In addition, the injection microslits 12 will operate as designed regardless of their position on the tubular structure 11. Such positioning, therefore, is controlled only by experimental need.

OPERATION OF THE INVENTION

In operation, the carrying fluid 19 is introduced to the particle feed 16 via the inlet structure 18. In the disclosed embodiment, air is supplied at a pressure, $P_{in}$, of 1000 psia, thereby lifting the particle feed 16 into the exhaust fairing 17 at a rate of 5 billion particles/sec, a velocity of $4\times10^{-3}$ ft/sec, and a mass flow of $3\times10^{-3}$ lbm/sec. Once guided through the fairing 17, the particles 16 will enter the tubular structure 11 for injection into the velocimeter's settling chamber 20.

The injection microslits 12 along the periphery of the tubular structure 11 are designed to provide a shearing effect on the agglomerated particles. The increase in the velocity gradient of the flow between the microslit 12 wall (velocity=0) and the center of the microslit 12 (sonic velocity) provides shear forces greater than interparticle bonding forces, thereby breaking up the agglomerates into individual particles.

In order for this generator 10 to operate as designed, the pressure of the inlet carrying fluid 19, $P_{in}$, must be approximately twice the ambient pressure of the velocimeter's settling chamber 20, $P_{sc}$, thereby ensuring sonic flow through the microslits 12. Specifically, $P_{in}$ for any gas is calculated by the following equation:

$$\frac{P_{sc}}{P_{in}} = \left(1 + \frac{\gamma - 1}{2} M^2\right)^{-\frac{\gamma}{\gamma-1}}$$

where,

M=Mach number of flow through microslits 12 (=1 for sonic flow)

$\gamma$=specific heat ratio of the gas $P_{sc}$=ambient pressure of the settling chamber 20

$P_{in}$=pressure of the inlet carrying fluid 19 and, $$\gamma = \frac{C_p}{C_v} = \frac{\text{specific heat at constant pressure}}{\text{specific heat at constant volume}}.$$

Maintenance of this pressure ratio, which is approximately 1:2 for most gases, will ensure that the microslits 12 operate at choked (sonic) flow conditions.

Operation at choked flow means simply that the flow through the microslits 12 is not affected by the pressure of the settling chamber 20, $P_{sc}$. The velocity of the particle flow in the tubular structure 11 increases steadily as the pressure of the inlet carrying fluid 19, $P_{in}$, approaches twice the ambient pressure of the settling chamber 20, $P_{sc}$. Near this point, as calculated by the above stated equation, sonic velocity is achieved in the microslits 12. It is well known physical phenomenon that once this pressure ratio is attained, the velocity of a flow through an orifice will not exceed sonic velocity (Mach 1 flow). Consequently, to increase $P_{in}$ further will result in an increased mass flow, but no change in the particle exit velocity. Because this choked (sonic) condition is a function of pressure ratio and not pressure level, the generator 10 is independent of small variations in $P_{sc}$ and, thereby, capable of generating particles even at high ambient pressures.

The advantages of this invention are numerous and it is particularly adapted for laser velocimeter particle generation. Because the system is capable of producing a cloud of uniform, submicron-sized particles at high pressure and high flow rates, it can attain the rigorous particle requirements of the laser velocimeter.

Another advantage of this invention lies in its ability to generate submicron particles regardless of external environment conditions.

Still another advantage of this invention is its capability to effectuate consistent and uniform separation of particle agglomerations.

The specifications herein discussed are not meant as limitations on the scope of the invention and its underlying theory as described in connection with the disclosed embodiment. Various changes may be made without departing from the scope of the invention as defined in the following claims.

What is claimed as new and desired to be secured by Letters Patent of the United States is:

1. An apparatus to supply a cloud of uniform, submicron-sized particles to a high pressure environment, comprising:

feeding system means for storing and supplying the desired particles;

conduit means for accepting said particles from said feeding system means, said conduit means having microslits on its periphery for separating and injecting said particles;

settling chamber means for receiving the injection of said particles from said conduit means; and carrying fluid means for transporting said particles wherein said carrying fluid means is supplied at a pressure sufficient to cause said microslits to operate at choked flow.

2. An apparatus as in claim 1 wherein said feeding system means comprises a casing whose dimensions are determined by the required mass flow rate of said particles.

3. A casing as in claim 2 having an inlet for supplying said carrying fluid.

4. A casing as in claim 3 having fairing means for guiding both said particles and said carrying fluid into said conduit means and ensuring a laminar flow therein.

5. An apparatus as in claim 1 wherein said microslits have a width of approximately 25–50μ and a length of approximately 300μ.

6. An apparatus as in claim 1 wherein said carrying fluid is supplied at a pressure of approximately twice the ambient pressure of the velocimeter's settling chamber so that said microslits will operate at choked flow conditions thereby resulting in shearing forces adequate to overcome interparticle bonding forces.

7. An apparatus as in claim 1 wherein said particles are mixed with a chemical which acts as a hydrophobic agent thereby ensuring easier, longer lasting primary particle dispersion.

8. An apparatus as in claim 1 wherein said particles are mixed with a chemical which acts as an electrical charge neutralizer.

9. An apparatus as in claim 7 wherein said chemical is $SiO_2$.

10. An apparatus as in claim 1 wherein:

said feeding system means comprises an upright, cylindrical casing;

said casing has an inlet at its bottom for introduction of said carrying fluid means;

said carrying fluid means is air supplied at a pressure of approximately twice the ambient pressure of the velocimeter's settling chamber;

said particles are mixed with $SiO_2$;

said conduit means is attached to said feeding system means by means of a fairing at the top of said casing;

said conduit means is tubular in shape;

said conduit means has microslits measuring 25μ in width and 300μ in length on its downstream side;

said microslits operate at choked flow conditions thereby effectuating uniform particle separation; and said conduit means is placed in the flow of the velocimeter's settling chamber injecting the separated particles therein.

* * * * *